(12) United States Patent
Russell et al.

(10) Patent No.: US 6,369,344 B1
(45) Date of Patent: Apr. 9, 2002

(54) SUBSTRATE FACING METHOD, BODY AND KIT

(75) Inventors: Mark Alexander Russell; Frederick Brian Russell, both of Sheffield (GB)

(73) Assignee: Cutting & Wear Developments, Ltd., Rotherham (GB)

( * ) Notice: Subject to any disclaimer, the term of this patent is extended or adjusted under 35 U.S.C. 154(b) by 0 days.

(21) Appl. No.: 09/485,961

(22) PCT Filed: Aug. 19, 1998

(86) PCT No.: PCT/GB98/02400

§ 371 Date: Feb. 18, 2000

§ 102(e) Date: Feb. 18, 2000

(87) PCT Pub. No.: WO99/08831

PCT Pub. Date: Feb. 25, 1999

(30) Foreign Application Priority Data

Aug. 19, 1997 (GB) .............................................. 9717498

(51) Int. Cl.[7] .............................. B23K 11/00; B23K 9/28
(52) U.S. Cl. ..................... 219/76.17; 219/93; 219/117.1
(58) Field of Search ........................... 219/117.1, 76.17, 219/77, 93; 427/468, 546, 597

(56) References Cited

U.S. PATENT DOCUMENTS

| | | | | |
|---|---|---|---|---|
| 2,330,289 A | * | 9/1943 | Keir ............................ 219/10 |
| 2,897,340 A | * | 7/1959 | Krieger ....................... 219/117 |
| 2,925,647 A | * | 2/1960 | Jones et al. ............... 29/155.55 |
| 2,994,762 A | * | 8/1961 | Todd et al. .................... 219/76 |
| 3,162,748 A | * | 12/1964 | Vogt ............................ 219/117 |
| 3,219,970 A | * | 11/1965 | Johnson ....................... 219/93 |
| 3,233,073 A | * | 2/1966 | Ruetschi ....................... 219/93 |
| 3,346,350 A | * | 10/1967 | Spooner ....................... 29/183 |
| 3,774,009 A | * | 11/1973 | Hodges ........................ 219/98 |
| 3,889,093 A | * | 6/1975 | Fawcett et al. ............... 219/77 |
| 3,913,716 A | * | 10/1975 | Sedlock ................... 192/107 R |
| 4,101,318 A | * | 7/1978 | Rudy ........................... 75/240 |
| 4,234,776 A | * | 11/1980 | Rudd et al. ............. 219/76.17 |
| 4,722,824 A | * | 2/1988 | Wiech, Jr. ...................... 419/6 |
| 5,289,965 A | * | 3/1994 | Yasui et al. ................. 228/157 |
| 5,852,272 A | * | 12/1998 | Amano ..................... 219/76.14 |
| 6,085,963 A | * | 7/2000 | Abela ......................... 228/119 |
| 6,196,338 B1 | * | 3/2001 | Slaughter et al. ........... 175/331 |

* cited by examiner

Primary Examiner—Tom Dunn
Assistant Examiner—Zidia Pittman
(74) Attorney, Agent, or Firm—John R. Casperson

(57) ABSTRACT

A method of facing a substrate comprises applying a plurality of facing bodies to a carrier in a pattern corresponding to the desired pattern of the bodies on the faced substrate. The carrier has holes positioned centrally with respect to each body. Each body has, on a contact face to be fixed to the substrate, spaced raised weld elements which serve to locate the contact face parallel to and spaced from the substrate. The carrier is applied to the substrate with the contact faces of the bodies facing the substrate and then each body is electrically welded to the substrate by applying a welding tip to the body through each hole. A gap remains between the contact face and the substrate. Finally, the bodies are brazed to the substrate and brazing material flows between the bodies and the substrate. A facing kit comprises a carrier strip with facing bodies adhered thereto, each having raised weld elements in the form of dimples or lines. Holes in the carrier give access to a rear face of the bodies by a welding tool to weld the bodies to a substrate while still attached to, and positioned on, the substrate by the carrier.

23 Claims, 6 Drawing Sheets

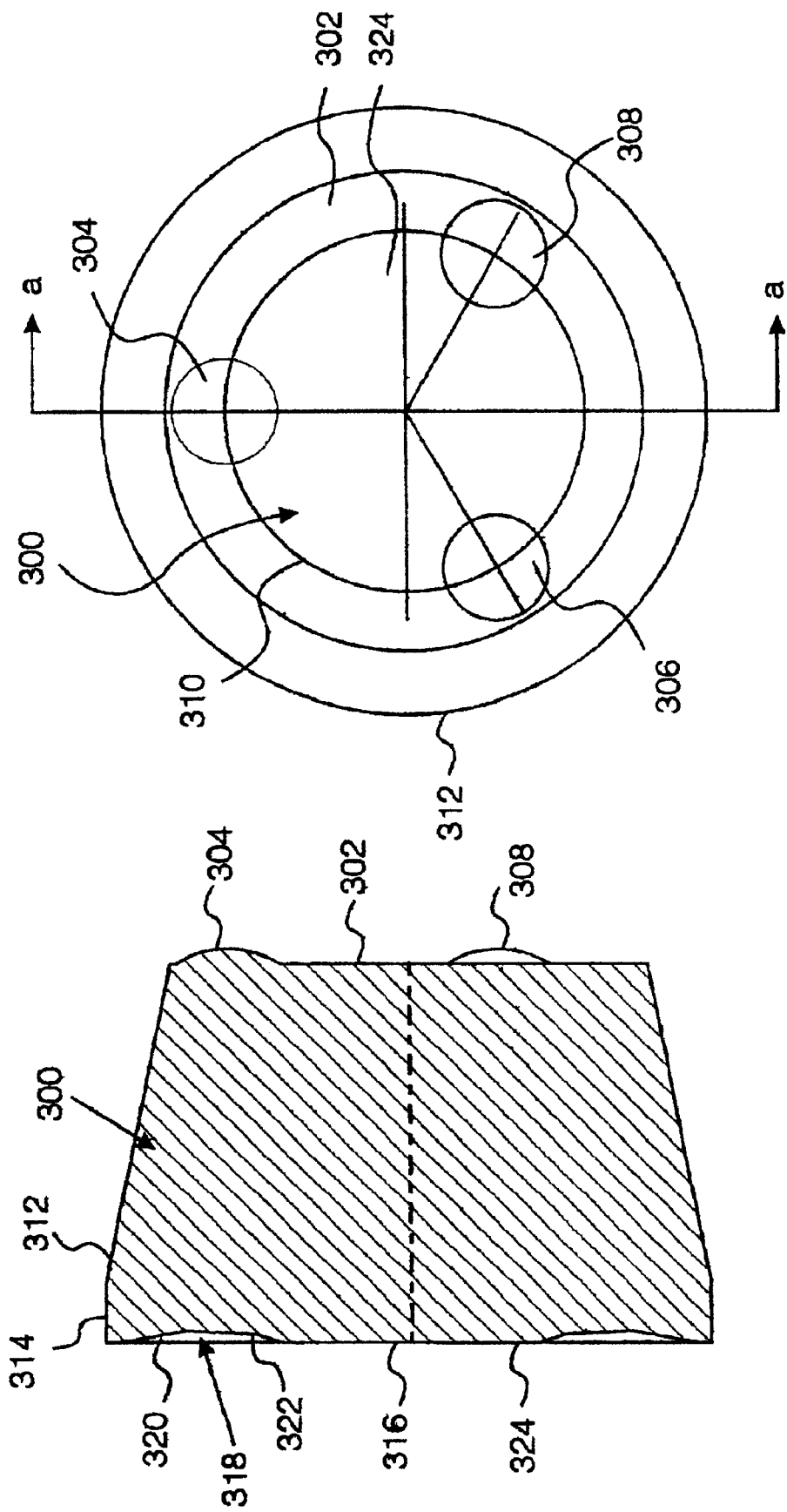

SUBSTRATE FACING METHOD, BODY AND KIT

This invention relates to a method of facing a substrate, a facing body for facing a substrate and a kit for facing a substrate. The method, body and kit ensure or obtain an improved degree of adhesion between the substrate and the facing body, which may be done, for example, to improve the wear resistance of faced surfaces, and in a convenient and easily employed way.

It is known to apply hard facing materials to surfaces of components, tools and implements which may be subject to wear in order to improve their wear resistant or cutting properties. An example of a hard facing material is tungsten carbide, which, in a known process, is positioned on a metal surface and then fixed in place by means typically of brazing, or soldering onto the surface. Usually, the tungsten carbide is in the form of small regular shaped blocks, often referred to as tips or inserts.

WO-A-9527588 discloses a method for facing a substrate, for example, a stabiliser for a drill string, using such tungsten carbide blocks of rectangular shape having sides of about 13 mm×5 mm and thicknesses of 3 mm. The entire contents of WO-A-9527588 are incorporated by reference herein for all purposes.

In WO-A-9527588, the following steps in a method of facing a substrate are described:

a) Tungsten carbide blocks are first treated by spraying, on a contact surface thereof, a layer of nickel alloy of about 0.25 mm thick.

b) The tungsten carbide blocks are then placed, with their sprayed faces being directed towards the substrate, in holes in a perforated mat of rubber. The holes are shaped so that the blocks form an interference fit therein. Typically the mat is of rectangular shape with sides 10 cm by 15 cm and a thickness of 3 mm. The mat conventionally comprises from 10 to 1,000 holes for the reception of the tungsten carbide blocks.

c) The flexible mat is then positioned upon the surface of the substrate, for example, a stabiliser, fishing tool or any other surface, whereupon it substantially conforms to the shape thereof whilst at the same time retaining each of the tungsten carbide blocks in a predetermined location.

d) The blocks are then each welded to the substrate using an electrical welding machine, the machine being set to apply a voltage of 75 volts and a current of 5000 amps to produce a weld joint or connection.

e) After the blocks have been welded to the substrate surface, the mat is removed, the substrate is heated to a temperature of between 80° C. and 150° C. (preferably about 125° C.) and sprayed with a nickel alloy to a thickness of 0.25 mm. The purpose of this is to reduce susceptibility to oxidation during subsequent processing.

f) The substrate is then further heated to a temperature of between 200° C. and 400° C. (preferably about 250° C.) and the entire surface is again sprayed with a nickel alloy until a layer of thickness about 3.5 mm has been built up; during spraying the temperature of the area around each block is raised to between 1050° C. and 1150° C. so that the alloy fuses.

The faces of the tungsten carbide blocks which contact the substrate, (hereinafter known as contact faces thereof), are substantially planar and make only a single point contact with the substrate if the substrate is curved. It will be appreciated that a substantially triangular void will be formed between the contact face and the substrate. This substantially triangular shaped void is filled with molten metal during the fusing process.

Furthermore, when using relatively large inserts, or when working with a flat substrate, the quality of the weld is unreliable due to the large areas of contact between the insert and the substrate and therefore the variable current density at the contact points and hence the temperature generated by resistance heating. In addition, the braze thickness is inconsistent.

Moreover, it has been facing that arcing can sometimes occur between those portions of the contact face and the substrate which have sufficient proximity to one another but which are not in contact with one another. This in turn reduces the quality of the weld as the welding current is distributed over a larger than desirable area.

Furthermore, step a) above is required in order to ensure that there is brazing material between the contact face of each block and the substrate, while step b) can be awkward and time consuming.

It is an object of the present invention to mitigate the problems of the prior art.

Accordingly, the present invention provides a method of facing a substrate comprising the steps of:

a) applying a plurality of facing bodies to a carrier in a pattern corresponding to the desired pattern of the bodies of the faced substrate, the carrier having holes positioned substantially centrally with respect to each body and each body having, on a contact face thereof to be fixed to said substrate, raised weld elements which serve to locate said contact face substantially parallel and spaced from the substrate;

b) applying the carrier to the substrate with said contact faces of the bodies facing the substrate;

c) electrically welding each body to the substrate by applying a welding tip to the body exposed through said hole, said weld elements ensuring that a gap remains between said contact face and substrate after welding; and d) brazing said bodies to said substrate so that brazing material flows between said bodies and the substrate.

Preferably, said bodies have a first face opposite said contact face, which first face is adhered to one side of said carrier. In which case, preferably, the method further comprises the step of:

e) before step d) above, peeling the carrier from the first faces of the bodies, step a) above including the step adhering with the releasable adhesive. Preferably, said carrier is paper. Alternatively, said carrier may be burnt off before step d).

Alternatively, said carrier may comprise a perforated rubber mat, said bodies being pressed into and retained by respective perforations which correspond in size and shape with the bodies.

The method preferably further comprises the step of:

f) before step d) above, but after step e) if applicable, heating the bodies and the substrate to a temperature of between 80° C. and 150° C. (preferably about 125° C.) and spraying with a stabiliser to inhibit oxidation. Said stabiliser may comprise a nickel alloy or a fluxing agent, and may be about 0.25 mm thick.

The method preferably further comprises the steps of:

g) after step f) above, further heating the bodies on the substrate to a temperature of between 200° C. and 400° C. (preferably about 250° C.) and spraying with braze material, preferably a nickel alloy; and wherein step d) above comprises fusing the alloy at a temperature of between 1050° C. and 1150° C.

Such a method has numerous advantages. An improved current path is created by the raised weld elements which reproducibly determines the contact between the bodies and the substrate. This consequently improves and makes more consistent the weld of the body to the substrate. Moreover, a consistent gap is left between the contact face and the substrate after welding so that the braze is drawn under the bodies by capillary action and the amount of braze is balanced. That is to say, with a flat substrate, the braze will reliably be of even thickness.

Moreover, because a gap is reliably produced for the braze material to be introduced under the bodies, step a) of the prior art method mentioned above can be eliminated. As a result, the carrier can be made of paper or card and the bodies can be adhered thereto as a first step in an automated process. On the other hand, the bodies could still be supplied loose for insertion in a rubber mat, as described in WO-A-9527588.

Accordingly, a second aspect of the present invention provides a facing body suitable for facing a fishing tool or drill string stabiliser for use in oil and gas industry drilling, comprising a body having a contact face and a working face opposite the contact face, wherein the contact face comprises spaced raised weld elements which serve to locate said contact face substantially parallel and spaced from a substrate to which the body is adapted to be fixed.

In a third aspect, the present invention provides a facing kit for facing a substrate comprising a carrier with facing bodies adhered by a first face thereof to the carrier in a pattern corresponding to the desired pattern of the bodies on the faced substrate, holes in the carrier each exposing substantially the centre of said first face of respective ones of said bodies, and the bodies having on a contact face thereof to be fixed to the substrate raised weld elements serving to locate said contact face substantially parallel and spaced from the substrate when the strip is applied thereto.

Preferably a peelable heat shrink layer is applied to the bodies and adhered to the carrier around the bodies. This ensures that the bodies are not dislodged from the carrier during transportation. Preferably each hole does not extend beyond the boundaries of said respective first face. The carrier may be a strip of paper or card.

Thus, step b) above of the prior art method is eliminated, at least in terms of a manual task to be completed at the point of application of the bodies to the substrate. Instead, this step can be automated and the bodies can be supplied to the person facing the substrate already adhered to the carrier. This is possible because, as mentioned above, step a) has been eliminated; which step would otherwise destroy the carrier given the temperatures involved in that spraying step. Moreover, the substrate facing bodies on the carrier can therefore be positioned on the substrate before being brazed to the substrate when both the substrate and the body are at room temperature. That is to say, there is no loss of heat which occurs between steps a) and b) of the prior art, since the rubber mat can only be loaded with blocks once they have cooled after step a). Thus, the overall energy required to fix the body to the substrate is reduced as compared to the prior art.

The present invention also increases the current density during welding, that is, by focusing the available current through the weld elements and so as to achieve good adherence. The reduction in the current required to produce an acceptable weld also leads to a reduction in the risk of damage to the first face of the insert.

An embodiment is provided wherein said raised weld elements comprise a plurality of raised dimples. Preferably said raised dimples have a radius of curvature of about 0.085 inches (2.159 mm). The diameter of said raised dimples is substantially 0.08 inches (2.032 mm). Preferably said raised dimples have a height of between substantially 0.001 inches (0.0254 mm) and 0.039 inches (1 mm). Three dimples are preferably provided, preferably defining the corners of an equilateral triangle.

Alternatively said raised weld elements may comprise a plurality of raised lines. Preferably said raised lines have a radius of curvature of 0.01 inches (0.254 mm). Typically the raised lines have a height of 0.01 inches (0.254 mm) and a width of 0.02 inches (0.508 mm). Alternatively, the raised lines have a substantially flat contact surface.

Each body may comprise a cuboid; in which case, the raised lines may be disposed parallel to one of the sides of the body or span the width or length of the body. Alternatively, the raised lines may be arcuate or substantially circular, and even concentric. The raised lines may have a substantially flat bottom surface.

Each body may comprise a substantially cylindrical peripheral side wall or a substantially triangular peripheral side wall. The side wall may be tapered. Advantageously, the tapered wall provides a positive cutting geometry. The side wall has a height of 0.02 inches (5.08 mm) or 0.25 inches (6.35 mm).

Although it is within the ambit of the present invention to apply the bodies to a rubber mat, one of the disadvantages of this arrangement is that the mat surrounding each body can be no thicker than the spacing required for the bodies on the surface to be faced. In fishing tools for the oil and gas drilling industry, the spacing between adjacent bodies should be very small, and preferably almost zero, so that use of the rubber mat is substantially impractical. On the other hand, in drill string stabilisers, the separation between facing bodies can be much larger, in which event the use of a rubber mat, while less convenient than a paper carrier, is still perfectly feasible.

Embodiments of the invention will now be described, by way of example only, with reference to the accompanying drawings in which:

FIG. 1 illustrates a substrate having a body of facing material attached thereto with the resultant spaces or voids being filled with a molten metal or an adhesive;

FIGS. 2a, b and c illustrate an embodiment of a facing body;

FIG. 3 illustrates a further embodiment of a facing body;

Figure 1:
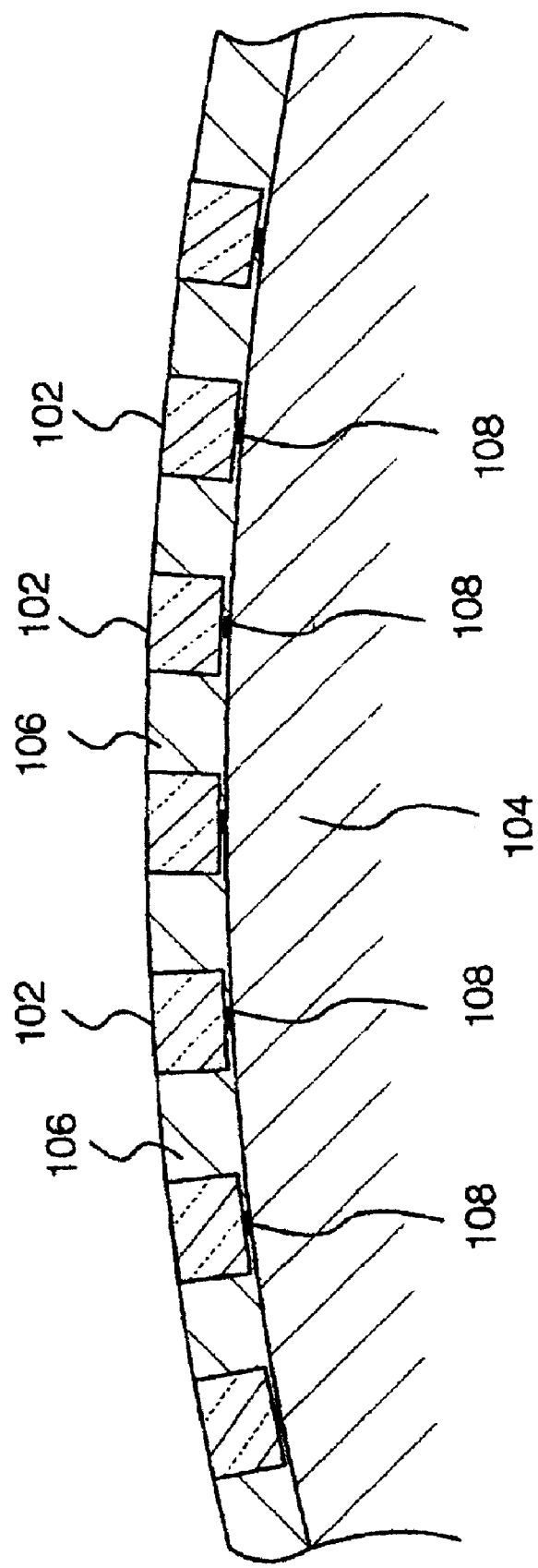

Referring to FIG. 1 there is shown a section through a plurality of tungsten carbide bodies or blocks 102 and a portion of a substrate surface 104 after a step of spraying with a suitable molten metal alloy 106. Weld joints 108 formed before the spraying step secure the blocks 102 in position for the spraying step. On subsequent fusing, the alloy 106 melts and flows by capillary action under the blocks 102.

Figure 2C:
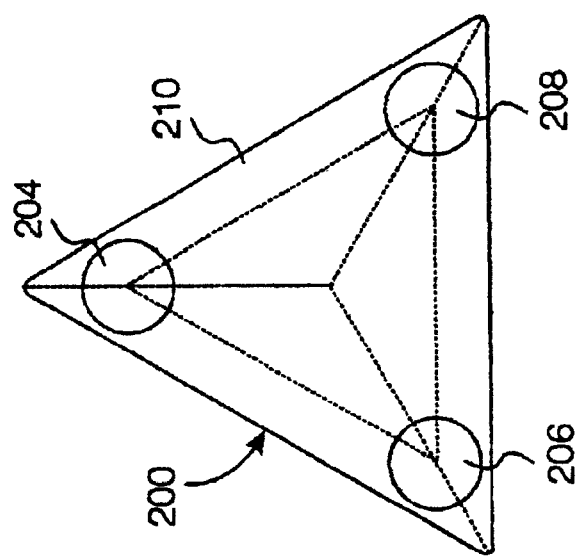
Figure 2B:
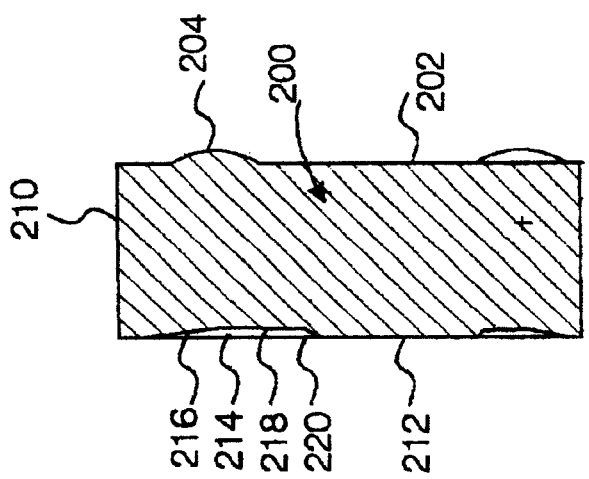
Figure 2A:
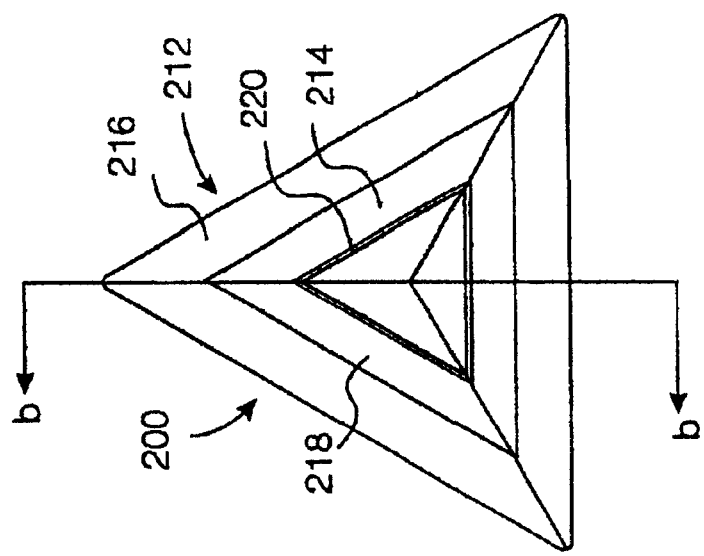

Referring to FIGS. 2a, b and c there is shown, in third angle projection, plan, cross-sectional (along the line b—b in FIG. 2a) and bottom views respectively of a preferred form of block or body 200. The tungsten carbide body 200 comprises a profiled bottom or contact surface 202 having three raised weld elements or projections in the form of dimples 204, 206 and 208. The distance between the centres of each dimple is 0.417 inches (10.59 mm). They have a radius of curvature 0.085 inches (2.159 mm) and a diameter of 0.08 inches (2.032 mm). The dimples project from the body 200 by 0.01 inches (0.254 mm). Typically the area of the projections is between 0.01 mm² and 10 mm². The height of the raised projections or dimples is typically between 0.01 mm and 1 mm.

The profiled contact surface 202, as a consequence of the raised or projecting dimples, in use, defines a brazed metal flow channel with the substrate (not shown). The gap formed between the profiled contact surface 202 and the substrate provides a more consistent depth of braze. The consistent braze depth provides for a more consistent degree of adherence between the substrate facing body and the substrate. Furthermore, the use of a controlled braze thickness reduces the stresses due to differential thermal expansion and contraction between the body and the substrate; which again, improves the quality of the adherence therebetween, particularly during cooling.

The carbide body 200 has a substantially triangular outer peripheral wall 210 having a height of 0.2 inches (5.08 mm).

Referring to FIG. 2a, the carbide body 200 comprises a further profiled working surface 212 being a recessed groove 214. Preferably the groove is substantially triangular and follows the shape of the outer peripheral wall 210.

The triangular groove 214 has a first portion 216 which slopes down to a substantially planar triangular portion 218 and second sloped portion 220 which rises from the substantially planar triangular portion 218 to the central portion of the further profiled surface 212.

Referring to FIGS. 3a and b there is shown a cross sectional (along the line a—a in FIG. 3b) and a bottom view respectively of a second embodiment of a tungsten carbide body 300. This comprises a profiled contact face 302 bearing three raised dimples which are mutually spaced apart by 120 degrees. The centres of the raised dimples 304 to 308 are all disposed on the circumference of the same circle 310.

The diameter of the raised dimples is 0.06 inches (1.24 mm). The radius of curvature of the raised dimples is 0.085 inches (2.159 mm). The height of the raised dimples is 0.01 inches (0.254 mm). The diameter of the contact face is 0.32 inches (8.128 mm).

The side wall 312 of the tungsten carbide body 300 is tapered from a substantially cylindrical portion 314 of the body 300 having a diameter of 0.375 inches (9.525 mm) and a depth of 0.025 inches (0.635 mm) down to the diameter of the contact face 302. The height of the tungsten carbide body 300, including the raised dimples, is 0.26 inches (6.604 mm). The tungsten carbide body 300 also comprises a working face 316 which is substantially parallel to the contact face 302. The working face 316 bears a recessed groove 318. The groove 318 has a sloping outer portion 320 and an inner quarter toroidal portion 322. The outer diameter of the sloping outer portion 320 is 0.365 inches (9.271 mm). The inner diameter of the sloping outer portion 320 or the outer diameter of the toroidal portion 322 is 0.286 inches (7.264 mm). The inner diameter of the toroidal portion 322 is 0.18 inches (4.572 mm) thereby defining a substantially circular central portion 324 of the working face 316 of the tungsten carbide body 300.

The radius of the curvature of the toroidal portion is 0.1 inches (2.54 mm) measured from a point which is 0.092 inches (2.336 mm) above the upper surface 316.

Figure 4:
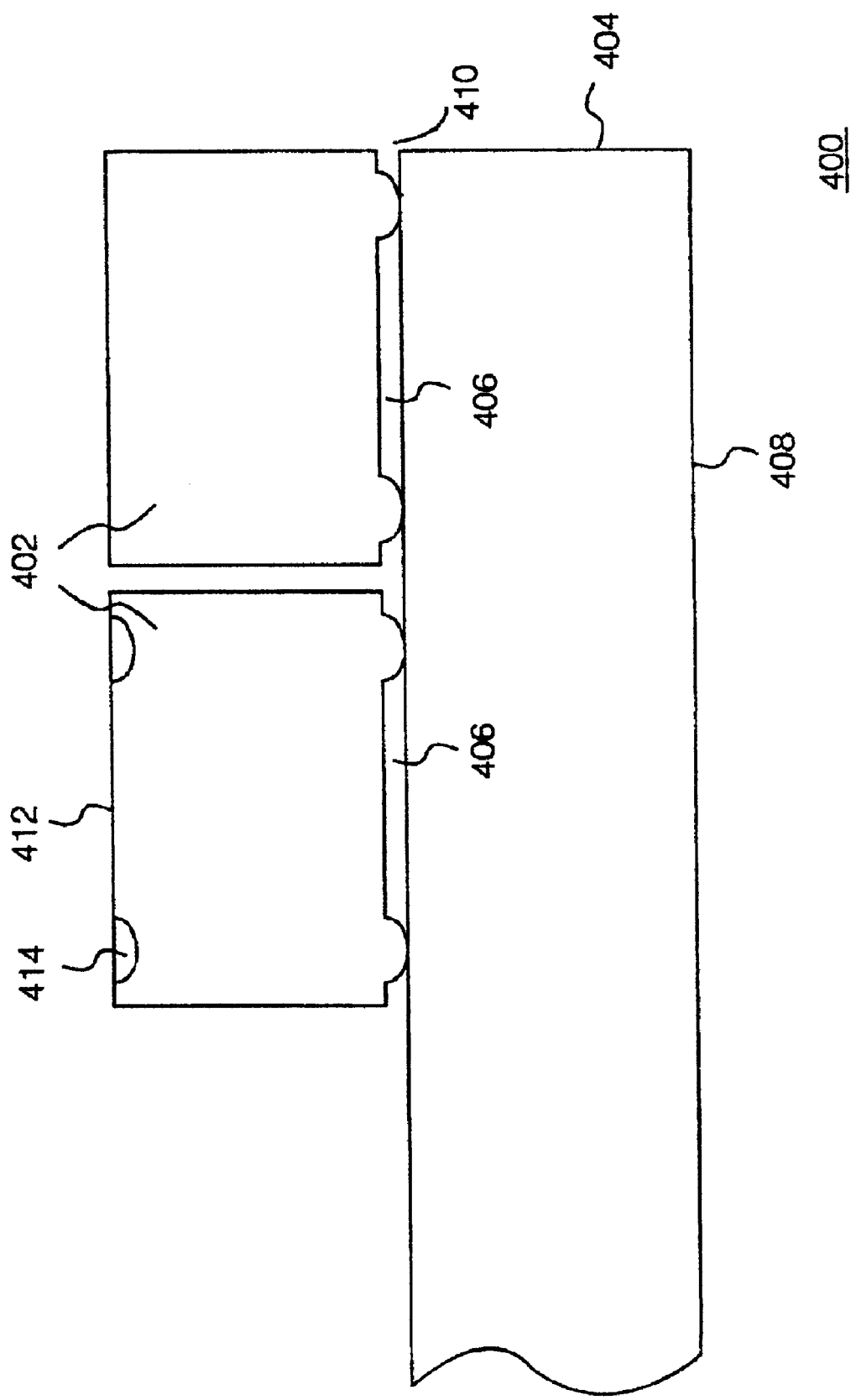
FIG. 4 illustrates brazing the substrate facing bodies after affixation thereof to the substrate.

Referring to FIG. 4, there is shown the processing of an assembly 400 comprising a plurality of substrate facing bodies 402 disposed on a flat substrate 404. The bodies 402 and substrate 404 define a channel 406 therebetween. The substrate is heated in any suitable manner, preferably from the reverse side 408 of the substrate 404. The braze is introduced from the side 410 of the channel. The combination of the heat and the channel dimensions allows the molten braze to be distributed by capillary action.

Distribution of the braze in the above manner reduces contamination of the upper, working surface 412 of the insert, which contamination could otherwise compromise the chip breaking qualities of the working surface 412. With conventional brazing the chip breaking recesses 414 might inadvertently be filled with braze metal.

The above facing method finds particular application in the facing of an oil industry fishing tool for milling out cased bore holes. Suitable brazes include those which are copper, silver or nickel based, for example nickel bronze alloys.

Figure 5:
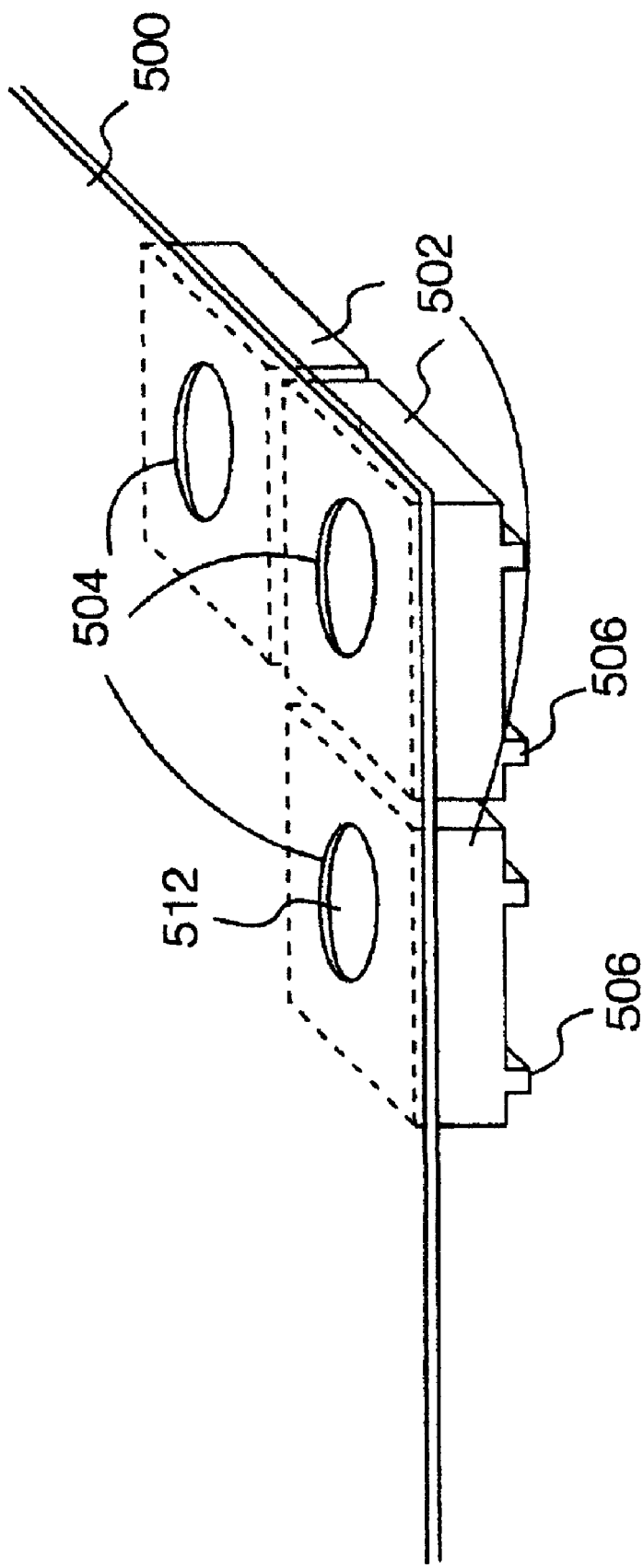
FIG. 5 shows a kit in accordance with the invention, comprising a carrier bearing a number of facing bodies for facing a substrate.

Referring to FIG. 5 there is shown a carrier 500 which bears a plurality of bodies 502 for facing a substrate. The bodies are arranged with separations between them of between 0 cm and 2.54 cm, preferably between 0 mm and 10 mm.

The carrier comprises a plurality of holes 504 for exposing first faces 512 of said bodies to the side of the carrier opposite to that side upon which the bodies are disposed. Preferably, the carrier is flexible. More preferably, the carrier is made from one of either paper, card, board or plastics. Alternatively, the carrier may be a woven mesh of carbon fibre, glass fibre, cotton or hessian. In any event it needs to be an electrically insulating material, or at least be electrically insulated from the bodies it is carrying so as not to compromise welding of the bodies to the substrate while carried by the carrier.

The relative positions of the tips or inserts on the carrier reflect the intended relative positions of the tips or inserts on the substrate surface. The carrier is positioned on the substrate, which, in the case of a fishing tool, would be a blade, typically with the tips or inserts being in contact with one another. The inserts are electrically welded to the substrate using a suitable welding machine. The carrier is then removed by peeling or is burnt off at a later stage. In the case of drill string stabilisers, the bodies are generally separated from each other by a few millimeters.

Advantageously, the use of a carrier reduces the time taken to prepare and face a substrate as a consequence of removing the prior art step of filling the rubber mat. Furthermore, the tips or inserts can be positioned closer together. The tips or inserts can be supplied already fixed to a carrier. Where the tips are adhered to the carrier by a releasable adhesive so as to reduce the carrier peelable, then it is advantageous to securely retain the tips on the carrier for transportation purposes by applying a heat shrinkable covering of a suitable plastics material and which adheres releasably to the carrier around the individual blocks, or at least around the periphery of the carrier if the blocks are closely disposed with respect to one another. Moreover, the carrier itself may be mounted on a relatively stiff base for transportation purposes, again, being adapted to be separated therefrom when the blocks are to be presented to a substrate, particularly a curved substrate.

Although the embodiments described above utilise raised dimples in order to provide weld elements serving to improve current paths and resulting welds, and to define a substantially constant brazed metal channel, the present invention is not limited thereto. An embodiment can equally well be realised in which the weld elements are in the form of raised lines or ridges.

Figure 6A:
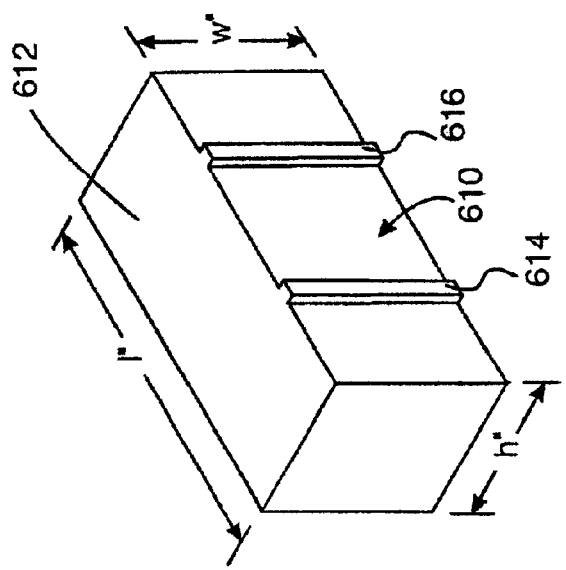
FIGS. 6a to 6d depicts further embodiments of facing bodies.

Referring to FIGS. 6a to 6d there is shown further embodiments of an insert or substrate facing body. FIG. 6a shows a body 600 having a trapezoidal cross section. The upper surface 602 of the body 600 has a width w of 6.4 mm.

The height h of the trapeze is 6.4 mm. The breadth b of the trapeze is 10 mm. The length l of the body 600 is 25 mm. The body 600 comprises a contact surface 604 which bears two raised lines 606 and 608.

Figure 6B:
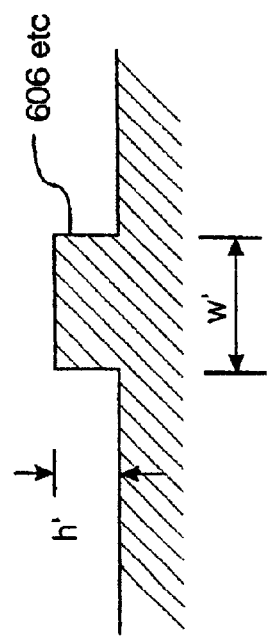
Figure 6C:
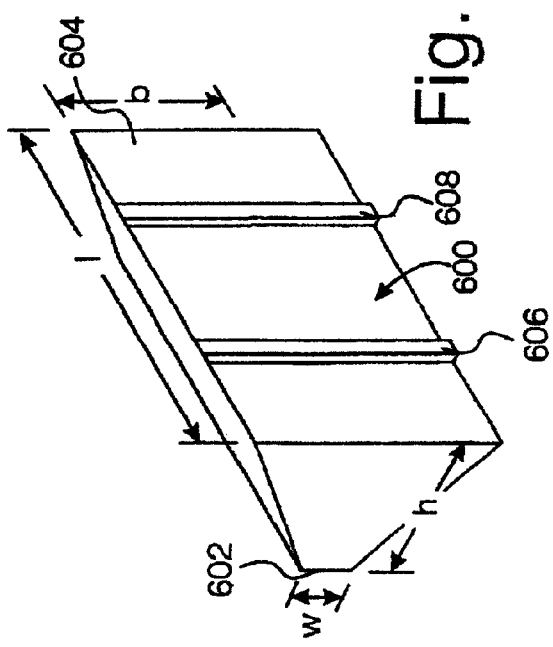

FIG. 6b illustrates an alternative embodiment in which the insert 610 has a rectangular cross-section having a height h" of 3 mm, width w" of 5 mm and length l" of 13 mm. Again, the insert 610 has a contact surface 612 which bears two raised lines 614 and 616. Finally, FIG. 6c shows a substrate facing body 618 having a substantially square contact surface 620 which bears two raised lines 622 and 624. The body has a height of 0.25 inches (6.25 mm), a width and length of 0.375 inches (8.5 mm).

Figure 6D:
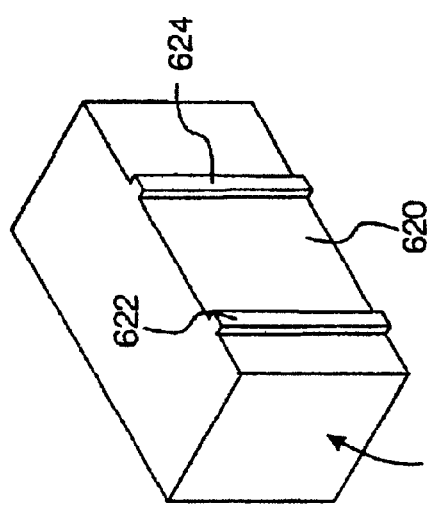

Referring to FIG. 6d, typically the raised lines 606 etc in FIGS. 6a to 6d have a width w' of 0.02 inches (0.5 mm) and a height h' of 0.01 inches (0.25 mm).

Although the above embodiments illustrate the raised lines as spanning the complete width of the insert, raised lines which stop short of the edges of the insert or which are disposed along the length or diagonally disposed could equally well be used.

What is claimed is:

1. A method of facing a substrate comprising the steps of:
   a) applying a plurality of facing bodies to a carrier in a pattern corresponding to a desired pattern of the bodies on a substrate to be faced, the carrier having holes positioned substantially centrally with respect to each body and each body having, on a contact face thereof to be fixed to said substrate, raised weld elements which serve to locate said contact face substantially parallel and spaced from the substrate;
   b) applying the carrier to the substrate with said contact faces of the bodies facing the substrate;
   c) electrically welding each body to the substrate by applying a welding tip to the body exposed through said hole, said weld elements ensuring that a gap remains between said contact face and substrate after welding; and
   d) brazing said bodies to said substrate so that brazing material flows between said bodies and the substrate.

2. A method as claimed in claim 1, in which said bodies have a first face opposite said contact face, which first face is adhered to one side of said carrier.

3. A method as claimed in claim 2, which further comprises the step of:
   e) before step d) above, peeling the carrier from the first faces of the bodies, wherein the bodies are adhered to the carrier in step a) above with a releasable adhesive.

4. A method as claimed in claim 2, in which said carrier is burnt off before step d).

5. A method as claimed in claim 3, in which said carrier is paper.

6. A method as claimed in claim 1, in which said carrier comprises a perforated rubber mat, said bodies being pressed into and retained by respective perforations of the mat which correspond in size and shape with the bodies.

7. A method as claimed in claim 3, which further comprises the step of:
   f) before step d), but after step e), heating the bodies on the substrate to a temperature of between 80 C. and 150 C. and spraying with a stabiliser to inhibit oxidation.

8. A method as claimed in claim 7, in which said stabiliser comprises a nickel alloy.

9. A method as claimed in claim 7, further comprising the step of:
   g) after step f), further heating the bodies on the substrate to a temperature of between 200 C. and 400 C. and spraying with braze material, and wherein step d) above comprises fusing the stabilizer at a temperature of between 1050 C. and 1150 C.

10. A facing kit for facing a substrate comprising a flexible carrier with facing bodies adhered by a first face thereof to the carrier in a pattern corresponding to a desired pattern of the bodies on a substrate to be faced, holes in the carrier each exposing substantially the center of said first face of respective ones of said bodies, and the bodies having on a contact face thereof to be fixed to the substrate, raised weld elements serving to locate said contact face substantially parallel and spaced from the substrate when the carrier is applied thereto.

11. A kit as claimed in claim 10, in which a peelable heat shrink layer is applied to the bodies and adhered to the carrier around the bodies.

12. A kit as claimed in claim 10, in which each hole does not extend beyond the boundaries of said respective first face.

13. A kit as claimed in claim 10, wherein said weld elements each comprise a raised dimple.

14. A kit as claimed in claim 13, wherein each said raised dimple has at least one characteristic selected from the group consisting of
   a radius of curvature of about 0.085 inches (2.159 mm),
   a diameter of substantially 0.08 inches (2.032 mm), and
   a height of between substantially 0.001 inches (0.0254 mm) and 0.039 inches (1 mm).

15. A kit as claimed in claim 13, in which each body has three dimples in an equilateral arrangement.

16. A kit as claimed in claim 10, wherein said weld elements each comprise a raised line.

17. A kit as claimed in claim 16, wherein said raised line has a height of between 0.001 inches (0.0254 mm) and 0.039 inches (1 mm).

18. A kit as claimed in claim 16, wherein said line spans across said body.

19. A kit as claimed in claim 10, wherein said body comprises a substantially cylindrical peripheral side wall.

20. A kit as claimed in claim 10, wherein said body comprises a substantially triangular side wall.

21. A kit as claimed in claim 19, wherein said side wall is tapered.

22. A facing body, suitable for facing a fishing tool or drill string stabiliser for use in the oil and gas drilling industry, comprising a body having a contact face and working face opposite the contact face, wherein the contact face comprises spaced raised weld elements which serve to locate said contact face substantially parallel and spaced from a substrate to which the body is adapted to be fixed, said weld elements each comprising a raised line spanning across said body.

23. A facing body as in claim 22 wherein each body has a pair of parallel weld elements spanning across said body.

* * * * *

UNITED STATES PATENT AND TRADEMARK OFFICE
CERTIFICATE OF CORRECTION

PATENT NO.   : 6,369,344 B1
DATED        : April 9, 2002
INVENTOR(S)  : Russell et al.

It is certified that error appears in the above-identified patent and that said Letters Patent is hereby corrected as shown below:

<u>Title page,</u>
Item [73], "Cutting & Wear Developments, Ltd." is corrected to :
-- Cutting and Wear Resistant Developments, Limited"

Signed and Sealed this

Fifth Day of November, 2002

*Attest:*

*Attesting Officer*

JAMES E. ROGAN
*Director of the United States Patent and Trademark Office*